F. McCARTHY.
Cotton Gin.
No. 1,675.
Patented July 3, 1840.
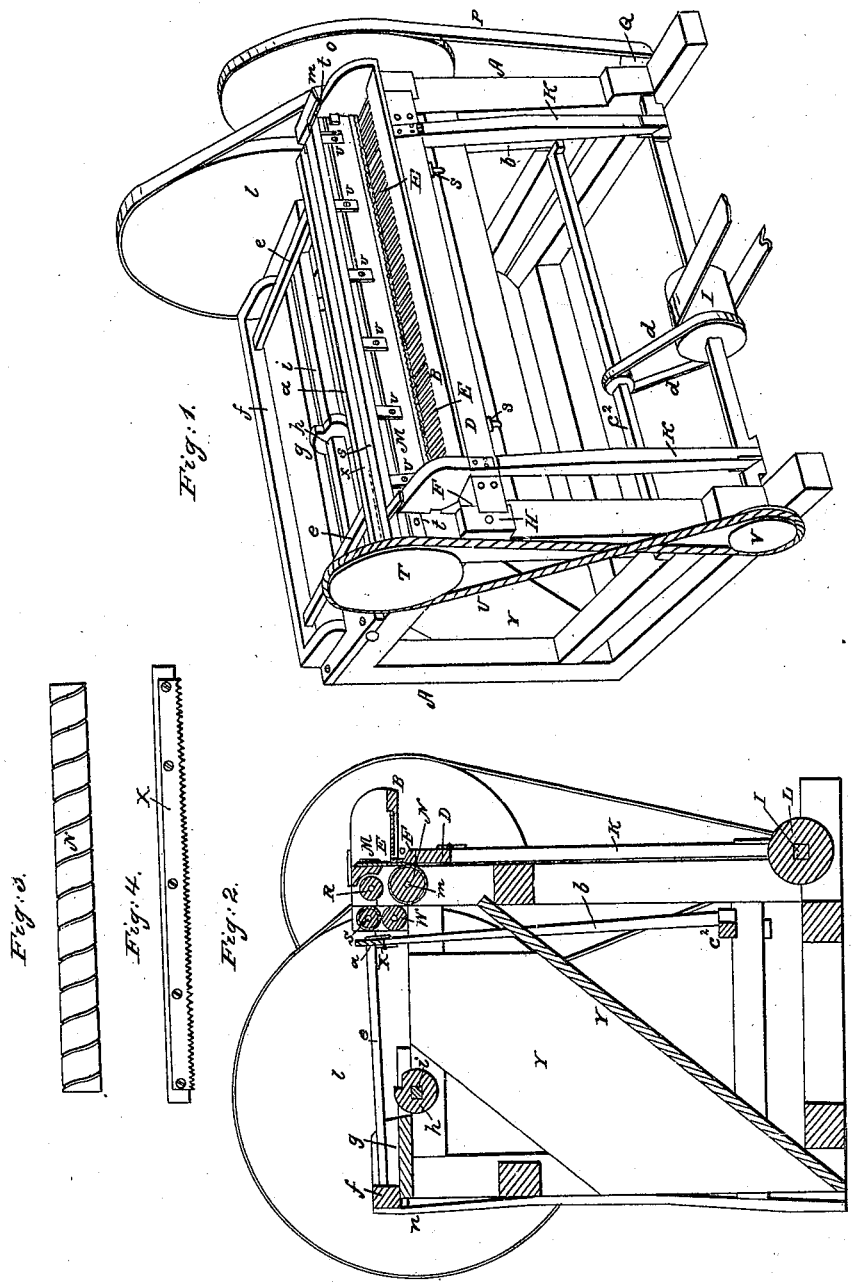

United States Patent Office.

FONES McCARTHY, OF DEMOPOLIS, ALABAMA.

IMPROVEMENT IN COTTON-GINS.

Specification forming part of Letters Patent No. 1,675, dated July 3, 1840.

*To all whom it may concern:*

Be it known that I, FONES MCCARTHY, of Demopolis, Marengo county, Alabama, have invented a new and useful Machine for Ginning Cotton called the "Smooth Cylinder Cotton-Gin," which is described as follows, reference being had to the annexed drawings of the same, making part of this specification.

Figure 1 is a perspective view of the machine. Fig. 2 is a vertical section; Fig. 3, drawing-cylinder; Fig. 4, the comb.

Similar letters refer to similar parts in the figures.

In front and near the top of a suitable frame, A, of proper size and sufficient strength, I arrange a hopper, B, for receiving the cotton, the bottom of which is horizontal and partly open-work, or a grate to allow the cotton-seed, when separated from the cotton, to fall through while the cotton is held thereon. The grate is composed of parallel rods, bars, or plates inserted into the solid part of the bottom of the hopper, and project toward the front of the frame, but not so far as to touch it, leaving room for a vertically-vibrating saw, hereinafter described, to rise and fall in the space thus left between the ends of said bars and the frame and rollers.

The vibrating saw C is about the length of the width of the frame inside and of suitable width and thickness, fastened to a beveled stay, F, lying on the top of a rising and falling cross-head, gate, or bar, D, by suitable fastenings, the teeth being on the upper edge thereof, and strengthened and prevented from taking too great a hold of the cotton by a thin guard-plate, E, placed against and secured to the side of the saw toward the hopper.

The beveled stay F, to which the saw and guard-plate are secured, is placed, as before mentioned, on the upper side of the cross-head, and may be moved thereon toward or from the frame, as required, in order to set the saw nearer to or farther from the steel plate M, hereinafter described, by having two screw-rods, $s\ s$, projecting down from said beveled stay, and passing through two oblong mortises in the cross-head, with nuts screwed on the ends of said rods against the under side of the cross-head for holding the saw firmly in its place. The ends of the saw move up and down in guides H, fastened to the outside of the corner-posts of the frame. The cross-head, gate, or bar is connected to a revolving crank-shaft, I, below the same, for giving it motion by two parallel hinged shackle-bars K K, which crank-shaft turns in boxes fastened on the sills of the frame, beyond which its ends project to receive pulleys for giving motion to other parts hereinafter described. A drum, L, is put on the crank-shaft, around which is passed a band leading to the driving-power. The saw moves up and down over a thin metallic adjustable plate, M, attached to a movable breast. This breast is made vertical on the front or side, against which the plate is placed, and concave on the back. It is let into the two front posts of the main frame by mortises and tenons, or by plates fastened to the ends of said breast, which drops into mortises in the posts, over which are placed clamp-plates $t\ t$, fastened by screws to the posts.

The adjustable plate is secured to the breast and adjusted in the following manner: A horizontal row of screws are inserted into the breast, over the shanks of which the plate is made to rise and fall by having oblong mortises therein, corresponding with said shanks, and when adjusted is held firmly by small clamp-plates $v$, placed between the heads of the screws and the adjustable plate, against which the heads of the screws are drawn. It is adjusted close to the surface of the drawing-cylinder, so that no seed or hard substances shall pass between it and the cylinder. The saw is adjusted to this plate by the two screw-bolts $s$ and nuts in the manner before described. By this construction and arrangement these parts may easily be removed and replaced for any purpose whenever required.

A large drawing-roller, N, covered with coarse leather or other suitable material for drawing the cotton in a broad sheet from the hopper through the space in which the saw moves, is placed directly behind, parallel with, and near to the metallic plate. It is grooved spirally around its surface, to receive in the spiral grooves any hard substances that might pass with the cotton to the rollers and discharge the same below. Its axle projects through the frame, on which there is a large pulley, O, and around which there is passed a band, P, leading to a small pulley, Q, on the crank-shaft, from which its motion is obtained. Over this drawing-roller is placed a small weighted roller, R, which rests upon the cotton as it passes between this and the aforesaid drawing-roller, its gudgeons moving in slots made in the two front posts of the frame. Immediately in the rear of this last-mentioned roller is placed a small receiving-roller, S, covered with cloth for receiving the cotton in a broad sheet from the drawing-roller, around which it is wound, and from which it is taken by a comb, X, hereinafter described. Its axle passes through the side of the frame opposite to that through which the axles of the drawing-roller passes, and receives a grooved pulley, T, around which is passed a crossed band, U, leading to another grooved pulley, V, on the other end of the crank-shaft I. Under the aforesaid receiving-roller is placed a small roller, W, whose gudgeons turn in slots in the frame, between which and the receiving-roller the cotton passes, being wound upon the latter. Behind the receiving-roller there is arranged a comb, X, for combing the ginned cotton from said roller and discharging it onto an inclined conductor, Y, which conveys it to the rear of the machine. This comb has a rising-and-falling as well as a backward-and-forward movement, produced in the following manner:

The stock $a$, to which the comb-plate $x$ is fastened, is connected by two parallel shackle-bars, $b\ b$, to a second crank-shaft, $c^2$, placed in the rear of the main one, and to which it is geared by a band, $d$, and pulleys, by which the comb receives its up-and-down movement. The comb-stock is likewise connected by two parallel bars, $e\ e$, to a vibrating axle, $f$, moving on gudgeons in a sliding carriage, $g$, which moves horizontally in grooves in the top and at the rear of the main frame, for allowing the comb to advance toward or recede from the receiving-roller, as required, which is effected by a cam-wheel, $h$, fixed on the axle $i$, lying across the frame a little in front of the carriage, on the end of which there is a large pulley, $l$, around which passes a band to a small pulley on the axle $m$ of the drawing-roller N. Two springs, $n\ n$, fastened to the frame, are placed behind and press against the carriage for keeping the comb near the receiving-roller.

Operation: The machine being set in motion, cotton is placed on the hopper and drawn therefrom by the drawing-roller, and in passing through the space between the hopper and said roller it is met by the saw, which carries it upward against the plate in the manner of shears, and separates the seed from the cotton, the seed falling back through the grate or between the parallel bars of the hopper into a trough or receiver below the same, while the cotton is drawn forward between the drawing-rollers, and passes between the receiving-roller and the smooth roller below it, and is wound upon the receiving-roller, from which it is stripped by the comb and discharged upon the inclined conductor as soon as it has taken up a sufficient quantity. During the time that the receiving roller is taking up the cotton the comb is receding from it by the action of the cam-wheel pressing against the carriage, which cam, after having performed a revolution, allows the carriage with the comb again to move forward by the action of the springs behind it, and bring the comb within reach of the cotton, which it strips from the roller by its vertical movement effected by the crank-shaft below. As soon as this is accomplished the cam-wheel again causes the carriage with the comb to recede.

What I claim as my invention, and which I desire to secure by Letters Patent, consists in—

The arrangement of the vibrating saw C, grated hopper B, adjustable plate M, and grooved drawing-roller N, for separating the seed from cotton, in combination with the receiving-roller $s$, and the advancing and receding comb X, for discharging it, as herein set forth.

FONES McCARTHY.

Witnesses:
　Wm. P. Elliot,
　H. W. Pitts.